United States Patent [19]

Hart

[11] 4,041,341
[45] Aug. 9, 1977

[54] DOPPLER-RADAR TERRAIN-CLEARANCE WARNING SYSTEM

[76] Inventor: Gerald E. Hart, Box 127 LOW, Locust Grove, Va. 22508

[21] Appl. No.: 689,896

[22] Filed: May 25, 1976

[51] Int. Cl.² .......................... G01S 9/22; G01C 5/00
[52] U.S. Cl. ................................ 343/5 R; 340/27 R; 343/7 TA
[58] Field of Search ........................... 343/7 TA, 5 R; 340/27 R

[56] References Cited

U.S. PATENT DOCUMENTS

| 3,187,328 | 6/1965 | Vetter | 343/7 TA |
| 3,553,689 | 1/1971 | Bechtel | 343/7 TA |

*Primary Examiner*—Maynard R. Wilbur
*Assistant Examiner*—Richard E. Berger

*Attorney, Agent, or Firm*—R. S. Sciascia; Philip Schneider; David G. Rasmussen

[57] ABSTRACT

A pulsed doppler-radar system is utilized to determine if the terrain clearance of an aircraft drops below a predetermined aircraft safety clearance. The system includes a maximum-range doppler-frequency counter which counts the highest doppler frequency received for a maximum range and a range gate which receives and passes doppler frequencies from within a predetermined slant range. A reference-frequency generator generates a reference frequency related to the highest doppler frequency and cooperates with a frequency synthesizer to synthesize a frequency related to the computed doppler frequency for the aircraft safety clearance. The slant-range doppler frequencies are summed with the synthesizer frequency and a critical-frequency detector detects the sum frequency to determine if terrain clearance drops below the predetermined aircraft safety clearance.

7 Claims, 3 Drawing Figures

DOPPLER-RADAR TERRAIN-CLEARANCE WARNING SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

The invention relates to a doppler-radar system for providing a warning if the terrain clearance of an aircraft drops below a predetermined distance at a predetermined slant range. More specifically, the invention utilizes a reference frequency related to the highest doppler frequency measured for a maximum range and the doppler frequency measured for a slant range to make such a determination.

2. Description of the Prior Art

A pilot needs a warning of an obstacle in his flight path twenty to thirty seconds in advance to be able to take corrective action. Accordingly, when traveling at a speed of 600 knots, the pilot must be warned of an obstacle about four miles ahead. Useful information to the pilot would be a warning if the terrain clearance between the aircraft flight path and the obstacle at a four mile slant range drops below a selected predetermined distance beneath the aircraft flight path (hereinafter aircraft safety clearance).

Attempts have been made to determine this information using available doppler-radar systems. One type of doppler-radar obstacle detection system analyzes doppler frequencies to determine if they are varying or constant. This indicates whether there is an obstacle in the flight path but does not provide any terrain clearance information or an indication if the terrain clearance drops below a selected aircraft safety clearance. Another type doppler-radar system uses a known aircraft altitude and speed together with a doppler frequency measured for a ground point to compute the depression angle between the aircraft flight path and ground point. From this information, the slant range to the ground point is computed. This system displays the relative position and size of protuberances for an aircraft ground track on a PPI type display. However, this system has the disadvantages that aircraft altitude and speed must be known and the system cannot provide information as to the size of the object with respect to the height of the aircraft. Both altitude and speed measurements are subject to substantial error.

What is needed is an accurate inexpensive doppler-radar system which can determine, independently of aircraft speed, if terrain clearance at a slant range of four miles drops below a predetermined aircraft safety clearance.

SUMMARY OF THE INVENTION

The present invention provides an improved doppler-radar system which utilizes the highest doppler frequency measured for a maximum range (hereinafter maximum-range doppler frequency) and the doppler frequency measured for a slant range to determine if terrain clearance drops below a predetermined aircraft safety clearance. The apparatus includes a conventional doppler-radar transmitter/receiver which provides signals to a maximum-range doppler-frequency counter and a range gate. The maximum-range doppler-frequency counter locks on the highest doppler frequency for a maximum range and provides an output to a reference-frequency generator. The reference-frequency generator produces a reference frequency related to the highest doppler frequency counted. A frequency synthesizer network receives the reference frequency and synthesizes a frequency which is related to the calculated doppler frequency for the desired aircraft safety clearance. The frequency synthesizer provides an output to a second summer. The range gate receives all doppler frequencies from within the desired slant range and rejects all other frequencies. The doppler frequencies passed by the range gate are fed to the second summer where they are summed with the synthesized frequency. The sum frequency is then fed to a second detector which determines if the sum frequency reaches a predetermined frequency related to the desired aircraft safety clearance. If the predetermined frequency is reached this indicates that terrain clearance has dropped below the aircraft safety clearance.

DESCRIPTION OF THE PREFERRED EMBODIMENTS

Figure 1:
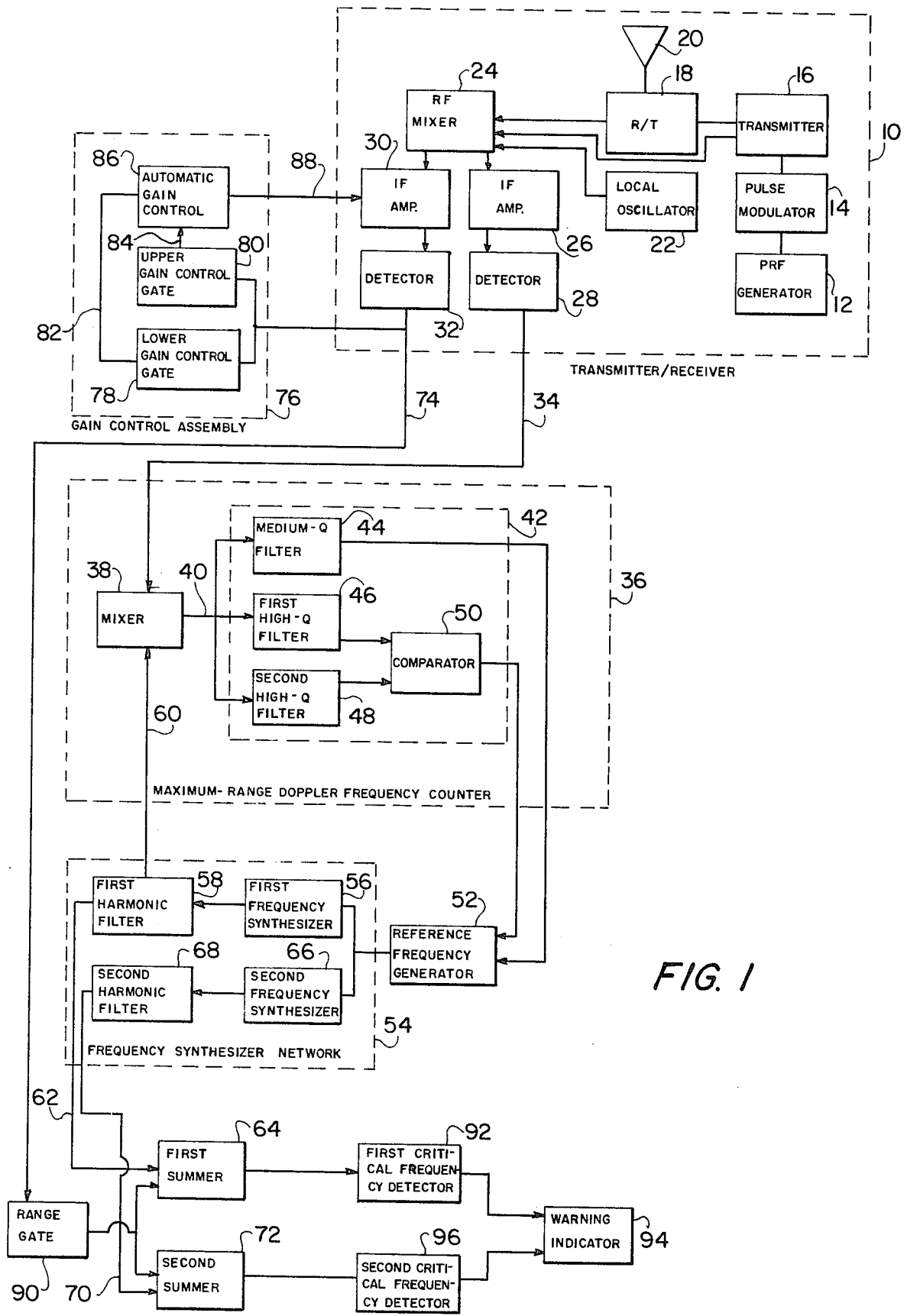
FIG. 1 is a block diagram representation of a doppler-radar warning system for determining if aircraft terrain clearance drops below a predetermined aircraft safety clearance.

A doppler-radar warning system for determining if aircraft terrain clearance drops below a predetermined aircraft safety clearance utilizing a maximum-range doppler frequency and a doppler frequency from a known slant range is outlined in FIG. 1. A conventional pulse-type doppler-radar transmitter/receiver unit 10 operates at L-band, typically 1300 mHz, and a PRF of typically 9524 pulses per second, and includes a conventional PRF generator 12, pulse modulator 14, transmitter 16, R/T unit 18, antenna 20, local oscillator 22, and RF mixer 24. Connected to RF mixer 24 is a maximum-range doppler IF amplifier 26 and its associated detector 28 which has at its output doppler frequencies for all points along the aircraft ground track including the maximum doppler frequency for ground points 15 miles or beyond. Also connected to RF mixer 24 is a slant-range doppler IF amplifier 30 and its associated detector 32 which has at its output all doppler frequencies for ground points of less than 8 miles including the slant-range doppler frequency for a ground point at 4 miles.

The output from detector 28 is connected through line 34 to a maximum-range doppler-frequency counter 36, which counts and locks onto the highest doppler frequency received for the maximum range. Maximum-range doppler-frequency counter 36 contains a mixer 38, an up-converter, which is connected through line 40 to maximum-range fixed-tuned filter assembly 42. The latter assembly 42 includes three fixed-tuned filters of typical value, first medium-Q filter 44 having a resonant frequency of 6597 Hz with a bandwidth of 10 Hz, first high-Q filter 46 having a resonant frequency of 6600 Hz with a 2 Hz bandwidth, second high-Q filter 48 having a resonant frequency of 6601.623 Hz with a 2 Hz bandwidth, and a comparator 50. The outputs of filters 46,48 are connected to comparator 50. Filter 44 and comparator 50 are connected to reference-frequency generator 52, typically a sweeping oscillator.

Reference-frequency generator 52 at lock-on produces a frequency which is mathematically related to the highest doppler frequency counted for the maximum range. The output of reference-frequency generator 52 is fed to frequency-synthesizer network 54 which synthesizes two frequencies from the reference frequency which are related to the computed doppler frequencies for two aircraft safety clearance values at slant ranges of 4 miles. Frequency-synthesizer network 54 is composed of a first frequency synthesizer 56 which generates a frequency that is initially utilized by maximum-range doppler-frequency counter 36 in locking on the maximum-range doppler frequency and then is used to provide an indication if terrain clearance drops to zero. The output of first frequency synthesizer 56 is fed to first harmonic filter 58 which filters out all harmonic frequencies of first frequency synthesizer 56 which would include all frequencies above 6945 Hz. To enable the second harmonic to be eliminated the minimum frequency of first frequency synthesizer 56 must be greater than one-half the resonant frequency of high-Q filter 48. The output of first harmonic filter 58 is fed through line 60 to mixer 38 and through line 62 to first summer 64. The output of reference-frequency generator 52 is also fed to second frequency synthesizer 66 which synthesizes a frequency related to the doppler frequency for a slant range of 4 miles and an aircraft safety clearance of 2000 ft. The frequency will be used to indicate when terrain clearance drops below 2000 ft. The output of second frequency synthesizer 66 is fed to second harmonic filter 68 which filters out all harmonic frequencies of second frequency synthesizer 66. The output of second harmonic filter 68 is fed via line 70 to second summer 72.

Returning to transmitter/receiver 10, the output of detector 32 is connected via line 74 to a gain-control assembly 76 whose purpose is to cause the rejection of doppler-radar returns from beyond 8 miles which would act as second round returns for a 2-4 mile range gate to be described subsequently. The rejection is accomplished by controlling the gain of IF amplifier 30. The output of line 74 is fed to a lower gain-control gate 78 which increases gain when there is a lack of doppler-radar returns from beyond 6 miles. The output of line 76 is also fed to upper gain-control gate 80 which decreases gain when doppler-radar returns appear from beyond 8 miles until the doppler-radar returns disappear. The outputs of lower gain-control gate 78 and upper gain-control gate 80 are fed via lines 82,84, respectively, to automatic-gain-control 86 which provides feedback through line 88 to IF amplifier 30. Lower gain-control gate 78 insures that doppler-radar returns up to 6 miles are present and upper gain-control gate 80 insures that doppler-radar returns over 8 miles are rejected.

Detector 32 is also connected via line 74 to 2-4 mile range gate 90 which passes only doppler frequencies for a slant range of 2-4 miles. The output of range gate 90 is fed to first summer 64, a mixer, and to second summer 72, also a mixer, where the slant-range doppler frequencies are mixed with the frequencies from first and second frequency synthesizers 55,56. The output of first summer 64 is fed to first critical frequency detector 92 (hereinafter first detector) which is a high-Q fixed-tuned filter having a center frequency such that when the sum frequency of first summer 64 reaches the center frequency a warning of zero terrain clearance will be indicated. The output of first detector 92 is provided to warning indicator 94 which displays a warning of zero terrain clearance. The output of second summer 72 is connected to second critical frequency detector 96 (hereinafter second detector), a high-Q fixed-tuned filter having a center frequency such that when the sum frequency of second summer 72 reaches the center frequency a warning that terrain clearance has dropped below the aircraft safety clearance of 2000 ft. is provided to warning indicator 94 for display. The aircraft safety clearance of 2000 ft. is only illustrative and other desired values could be used. In addition, the system could operate with only one or with more than two warning indication channels at various aircraft safety clearances.

Figure 2:
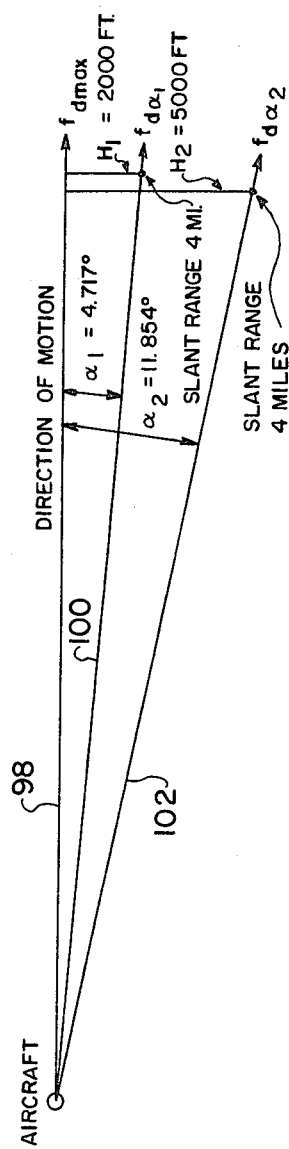
FIG. 2 is a diagrammatic view showing the geometric relationship of the parameters involved in providing a terrain clearance warning system.

FIG. 2 shows the geometric relationship of the parameters necessary to determine if aircraft terrain clearance drops below a predetermined aircraft safety clearance. Line 98 represents a level flight path parallel to earth; line 100 represents an aircraft safety clearance of 2000 ft. at a slant range of 4 miles; and line 102 represents a 5000 ft. terrain clearance at a slant range of 4 miles. To make a determination if terrain clearance drops below a predetermined aircraft safety clearance of 2000 ft., as with line 98, it is necessary to calculate angle $\alpha_1$ from the following relationship:

$$\sin \alpha_1 = \frac{\text{aircraft safety clearance } (H_1)}{\text{slant range}}$$

Once angle $\alpha_1$ is computed the doppler frequency along line 100 which would be expected from a potential protuberance rising to that height can be calculated from the following relationship:

$$f_{da_1} = (\cos \alpha_1)(f_{dmax})$$

The doppler frequency for the flight path $f_{dmax}$ is an approximation of the doppler frequency for ground reflections at 15 miles or beyond since the latter ground reflections at 15 miles or beyond have a maximum value which is nearly the same as for the flight path. This approximation is used because it is difficult to directly measure a doppler frequency along the flight path and the error involved is insignificant. A true measurement of $f_{dmax}$ may be accomplished only when there is an object in the flight path.

Once the expected doppler frequency $f_{da_1}$ is computed, it may be compared in a manner to be described subsequently with the incoming doppler frequencies. If the desired comparison is established this indicates that terrain clearance has dropped below 2000 ft.

Figure 3:
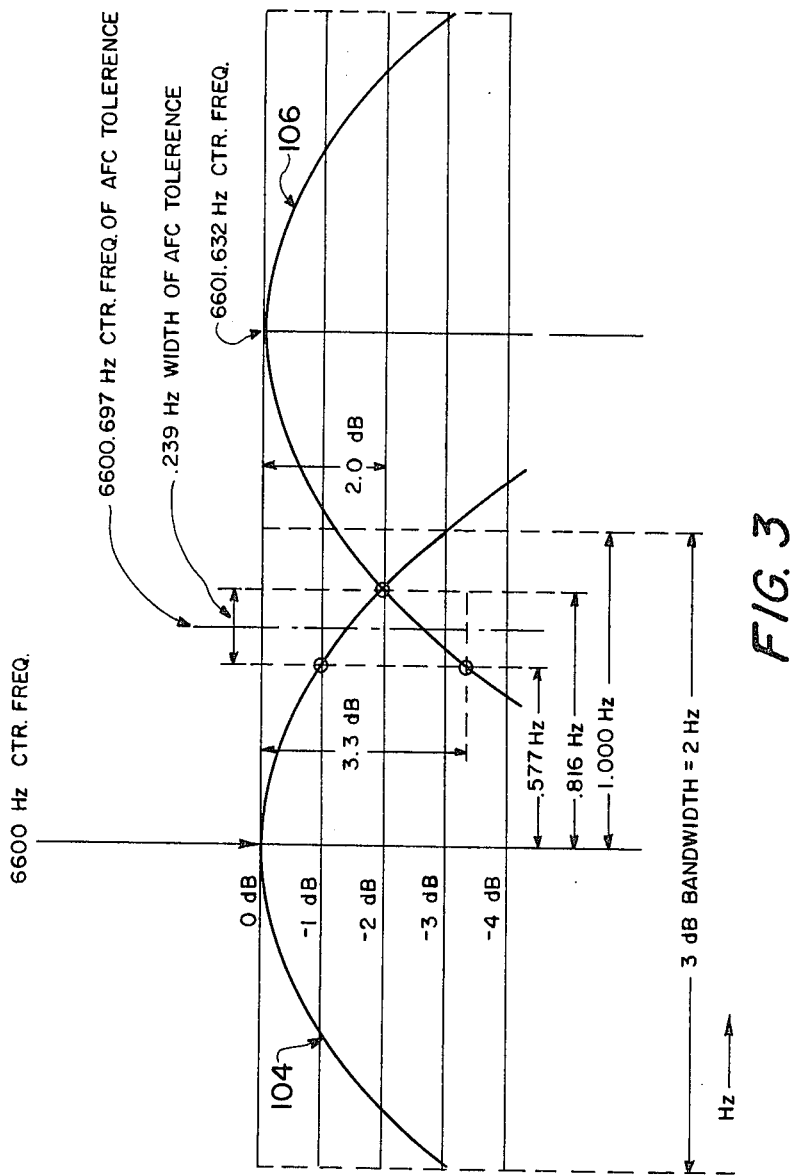
FIG. 3 is a diagrammatic view showing the response curve of the maximum-range fixed-tuned filter for accomplishing automatic-frequency-control.

FIG. 3 shows the response curves for maximum-range fixed-tuned filter 42. Response curves 104,106 are the response curves for first and second high-Q filters 46 and 48. The frequency 6600.816 Hz, at which response curves 104,106 intersect is the frequency at which second high-Q filter 48 (curve 106) reaches a level 2-db below the maximum response of first high-Q filter 46 (curve 104). This frequency represents the upper edge of the 0.239 Hz AFC tolerance band. The lower edge of the AFC tolerance is at 6600.577 Hz where the response of second high-Q filter 48 reaches a level 3.3-db below the maximum response of first high-Q filter 46. The center frequency 6600.697 Hz, of the AFC tolerance is the center or lock-on frequency for the overall maximum-range fixed-tuned filter 42.

The operation of the system in general is as follows. A pulsed doppler-radar return consisting of doppler-radar reflections from all points along the ground track of the aircraft is received at transmitter/receiver 10. The doppler frequencies are passed to maximum-range doppler-frequency counter 36 which cooperates with reference-frequency generator 52, and frequency-synthesizer network 54, to count and lock on the highest doppler frequency received for the maximum range. After lock on, the system is in condition to examine whether terrain clearance has dropped below aircraft safety clearance. At lock on, the frequency of reference-frequency generator 52 is related to the maximum-range doppler frequency. The reference frequency is fed to frequency-synthesizer network 54 which synthesizes a frequency which is the difference of the computed doppler frequency for the slant range at the predetermined aircraft safety clearance and the second critical frequency which is the center frequency of second detector 96. The synthesized frequency will be mathematically related to the second critical frequency which when detected, will indicate that the aircraft is below the aircraft safety clearance. The second critical frequency will be in the previously described cos α, relationship with the maximum-range doppler frequency. The synthesized frequency is fed to a summing circuit such as second summer 72. Second summer 72 also receives all doppler frequencies for a 2-4 mile range from range gate 90. The received doppler frequencies and the synthesizer frequency are summed in second summer 72. The doppler frequencies of the ground reflections will vary depending on the terrain clearance of the aircraft therefore the sum of the frequencies will vary. When the sum of the frequencies indicates that the terrain clearance of the aircraft has reached the aircraft safety clearance, second detector 96 will detect the sum frequency and send a warning indication to warning indicator 94. Second detector 96 will provide a correct indication of whether terrain clearance drops below aircraft safety clearance independent of aircraft speed since a change in aircraft speed causes corresponding changes in the maximum-range doppler frequency and slant range frequency and inverse compensating changes in the reference frequency and synthesized frequencies.

Looking at the operation of maximum-range doppler-frequency counter 36, more specifically, mixer 38 receives the incoming doppler frequencies and the sweeping frequency from first frequency synthesizer 56 through harmonic filter 58. The doppler frequencies and sweeping frequency are mixed in first mixer 38 to obtain a sum frequency which is fed through line 40 to first medium-Q filter 44, first high-Q filter 46, and second high-Q filter 48. As the sweeping frequency increases, the sum frequency of mixer 33 increases until it reaches the resonant frequency of first medium-Q filter 44 at 6597 Hz. At this point, first medium-Q filter 44 provides an output through line 56 to reference-frequency generator 52, where the sweep rate will shift from a fast sweep to a slow sweep. This will cause the sum frequency of mixer 36 to increase slowly from 6597 Hz to approximately 6600 Hz where the resonant frequencies of first and second high-Q filters lie at 6600 Hz and 6601.632 Hz, respectively. As 6600 Hz is approached the outputs of filters 46,48 are fed to comparator 50 where the outputs are compared. This comparison accomplishes automatic-frequency-control of reference-frequency generator 52 in the following manner. As the frequency slowly increases, the output of second high-Q filter 46 reaches a level 2-db below the maximum output of first high-Q filter 46 at 6600.816 Hz. At this point, comparator 50 sends an output to reference-frequency generator 52 to stop the sweep and reverse it. As the frequency of reference-frequency generator 52 slowly reduces, the output of second high-Q filter 48 declines until it is reduced to 3.3 db lower than the maximum output of first high-Q filter 46 at 6600.577 Hz. At this point, comparator 50 sends an output to reference-frequency generator 52 to reverse the sweep again and repeat the automatic-frequency-control cycle. As is shown in FIG. 4 the automatic-frequency-control locks reference-frequency generator 52 into an output frequency that will result in a sum frequency variation of only 0.239 Hz. This narrow tolerance is essential in order to avoid unreasonable error.

Reference-frequency generator 52 at this point is in the locked state and provides a constant frequency output to first and second frequency synthesizers 56, 66. First frequency synthesizer 56 synthesizes a frequency from the reference frequency which is the difference between the maximum-range doppler frequency and the center frequency for the AFC tolerance band, 6600.697 Hz. This frequency is fed through harmonic filter 58 to mixer 38 to accomplish the counting and lock-on of the maximum-range doppler frequency as previously described and to summer 64 for use in determining whether terrain clearance has dropped to zero. Second frequency synthesizer 66 synthesizes a frequency from the reference frequency which is related to the calculated doppler frequency for a 2000 ft. aircraft safety clearance. The output of second frequency synthesizer 66 is fed through harmonic filter 68 to second summer 72 for use in determining if terrain clearance drops below the 2000 ft. aircraft safety clearance.

The slant-range doppler frequencies which must be summed with the synthesized frequencies in first and second summers 64, 72 are obtained in the following manner. The doppler-radar return received at transmitter-receiver 10 is passed to IF amplifier 30. IF amplifier 30 operates in conjunction with gain-control assembly 76 to reject all doppler-radar returns from beyond an 8 mile range and thus prevent second round reflections which would otherwise occur when using a typical PRF of 9524 pulses per second. The output of IF amplifier 30 is fed to detector 32 which feeds an output through line 74 to lower gain-control gate 78 and upper gain-control gate 80 of gain-control assembly 76. If doppler-radar returns from beyond 8 miles are received, upper gain-control gate 80 causes the gain of automatic-gain-control 86 to decrease until the returns from beyond 8 miles disappear. if doppler-radar returns from the range between 6 and 8 miles are received, no action is taken. If no doppler-radar returns are received from beyond a range of 6 miles, lower gain-control gate 78 causes the gain to increase. In summary, lower gain-control gate 78 insures that doppler frequencies from 6 miles or more are present while upper gain-control gate 80 rejects all doppler frequencies from beyond 8 miles. The output of automatic-gain-control 86 is feedback to IF amplifier 30. Range gate 90 receives the doppler frequencies from line 30 and passes only those doppler frequencies from the range of 2-4 miles. These doppler frequencies are then fed to first summer 64 and second summer 72.

In second summer 72 the doppler frequencies are summed with the frequency from second frequency synthesizer 66. At this point the synthesizer frequency is constant (if aircraft velocity is constant) and the doppler frequency for the slant range is variable depending on the variations in terrain clearance. The sum frequency is fed to second detector 96 whose resonant frequency is fixed by the relationship:

resonant frequency $= f_{d\alpha_1} + f_{2nd}$ synthesizer as long as the terrain clearance is greater than 2000 ft. at 4 miles, the reflected signals that are admitted by the range gate 90 will be from points on depression angles greater than $\alpha_1$ with doppler frequencies less than $f_{d\alpha_1}$, and hence the sum frequency will not reach the resonant frequency of second detector 96. Therefore no warning is provided to warning indicator 94. If the incoming doppler frequencies reach or exceed $f_{d\alpha_1}$, the resonant frequency is reached and a warning indication is provided.

If aircraft velocity decreases causing the maximum-range doppler-frequency and slant-range doppler frequency to decrease, the reference frequency increases proportionally thus increasing the second frequency synthesizer 74 frequency and enabling the resonant frequency of second detector 96 to stay constant and still function properly.

First summer 64 mixes the incoming slant-range doppler frequencies from range gate 90 with the frequency from first frequency synthesizer 56 and provides a sum frequency to first detector 92. In the same manner as with second detector 96, first detector 92 provides an output when the doppler frequency at a range of 4 miles is the same as the doppler frequency at maximum range which in turn, results in an indication that the projected terrain clearance has dropped to zero.

A typical application for the terrain clearance and warning system described herein would be an installation in a conventional commercial jet aircraft which has a weather radar in the nose. The antenna for the proposed system would consist of fixed "invisible" dipoles placed in front of the the weather radar antenna and designed to produce a horizontal beamwidth of approximately 40° (to accommodate crab angles) and a vertical beamwidth of 30°. The "invisible" dipoles would be designed to produce no appreciable degradation to the weather radar. A conventional L-band radar with peak power of 2 to 3 kw and pulse lengths of 8 $\mu$sec should provide ample signals out to 20 miles or beyond. This device would prove especially valuable when approaching an airfield surrounded by hills or mountains during periods of low visibility.

Although the described system uses analog processing of signals, it would be obvious to replace all analog steps by digital steps. Such a digital system is intended to be within the scope of the appended claims. Obviously many other modifications and variations of the present invention are possible in light of the above teachings. It is therefore to be understood that within the scope of the appended claims the invention may be practiced otherwise than as specifically described.

What is claimed and desired to be secured by letters patent of the United States is:

1. A pulsed doppler-radar system including a doppler-radar transmitter/receiver for determining if the terrain clearance of an aircraft drops below a predetermined aircraft safety clearance comprising:

maximum-range doppler-frequency counter means receiving an output from said transmitter/receiver for counting the highest doppler-frequency for a maximum range;
    a reference-frequency generator means receiving the output of said maximum-range doppler-frequency counter for generating a reference frequency related to said highest doppler frequency counted;
    frequency synthesizer network means receiving the output of said reference-frequency generator means for synthesizing a frequency related to said aircraft safety clearance from said reference frequency;
    range gate means receiving the output of said transmitter/receiver for receiving all doppler frequencies from within a predetermined slant range and rejecting all others;
    a second summer means receiving the outputs of said frequency synthesizer network means and said range gate means for summing the outputs of said frequency synthesizer network means and said range gate means; and
    second detector means receiving the output of said second summer means for detecting if the output of said second summer means reaches a predetermined frequency related to said aircraft safety clearance.

2. The apparatus of claim 1 including:
    a gain-control assembly receiving an output from said transmitter/receiver and providing a feedback signal to said transmitter/receiver; and
    an indicator receiving the output of said second detector means.

3. The apparatus of claim 2 in which said maximum-range doppler-frequency counter means includes:
    a mixer receiving an output from said transmitter/receiver; and
    a maximum-range fixed-tuned filter receiving the output of said mixer and providing an output to said reference-frequency generator means.

4. The apparatus of claim 3 in which said frequency-synthesizer network means includes:
    a second frequency synthesizer receiving the output of said reference-frequency generator means; and
    a second harmonic filter receiving the output of said second frequency synthesizer and providing an output to said second summer means.

5. The gain-control assembly of claim 4 including:
    an automatic-gain-control producing a feedback signal to said transmitter/receiver;
    an upper gain-control gate receiving the output of said transmitter/receiver and providing a signal to said automatic-gain-control; and
    a lower gain-control gate receiving the output of said transmitter/receiver and providing a signal to said automatic-gain-control.

6. The maximum-range fixed-tuned filter of claim 5 which includes;
    a medium-Q filter receiving the output of said mixer and providing an output to said reference-frequency generator means;
    a first high-Q filter receiving the output of said mixer;
    a second high-Q filter receiving the output of said mixer; and
    a comparator receiving the outputs of said first and second high-Q filters and providing an output to said reference-frequency generator means.

7. A method for utilizing the doppler radar system of an aircraft to determine if terrain clearance drops below a predetermined aircraft safety clearance at a known slant range comprising the steps of:
    transmitting radar pulses;

receiving and determining the highest doppler frequency of said radar return pulses generating a reference frequency related to said highest doppler frequency;

synthesizing from said reference frequency a frequency related to the computed doppler frequency for said predetermined aircraft safety clearance;

receiving and determining all doppler frequencies from radar return pulses received from within a predetermined slant range and rejecting all other frequencies;

summing said synthesized frequency and said doppler frequencies from within said predetermined slant range;

detecting if said summed frequency reaches said predetermined frequency related to said predetermined aircraft safety clearance to provide an indication if terrain clearance drops below said predetermined aircraft safety clearance.

* * * * *